United States Patent
Doerr et al.

(10) Patent No.: US 10,088,733 B2
(45) Date of Patent: Oct. 2, 2018

(54) SEGMENTED TRAVELING WAVE OPTICAL MODULATORS AND RELATED METHODS

(71) Applicant: Acacia Communications, Inc., Maynard, MA (US)

(72) Inventors: Christopher Doerr, Middleton, NJ (US); Ricardo Aroca, Springfield, NJ (US); Long Chen, Marlboro, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 15/230,582

(22) Filed: Aug. 8, 2016

(65) Prior Publication Data

US 2018/0039151 A1    Feb. 8, 2018

(51) Int. Cl.
| | |
|---|---|
| *H04B 10/12* | (2006.01) |
| *G02F 1/225* | (2006.01) |
| *H04B 10/516* | (2013.01) |
| *H04B 10/80* | (2013.01) |
| *G02F 1/21* | (2006.01) |

(52) U.S. Cl.
CPC .......... *G02F 1/2255* (2013.01); *G02F 1/2257* (2013.01); *H04B 10/516* (2013.01); *H04B 10/801* (2013.01); *G02F 2001/212* (2013.01)

(58) Field of Classification Search
None
See application file for complete search history.

(56) References Cited

U.S. PATENT DOCUMENTS

| | | | | |
|---|---|---|---|---|
| 5,208,697 | A | * | 5/1993 | Schaffner ............ G02F 1/2255 359/254 |
| 5,359,449 | A | * | 10/1994 | Nishimoto ............ G02F 1/0123 359/245 |
| 7,394,948 | B1 | * | 7/2008 | Zheng .................... G02B 6/132 385/2 |
| 8,346,025 | B2 | | 1/2013 | Gill |
| 9,036,954 | B2 | | 5/2015 | Kobrinsky et al. |

(Continued)

FOREIGN PATENT DOCUMENTS

JP    5994230    9/2016

OTHER PUBLICATIONS

Aroca et al., A 2.4-V 60-Gb/s CMOS Driver With Digitally Variable Amplitude and Pre-Emphasis Control at Multiple Peaking Frequencies. IEEE J Solid-State Circ. Oct. 2011;46(10):2226-39.

(Continued)

*Primary Examiner* — Ken N Vanderpuye
*Assistant Examiner* — David Lambert
(74) *Attorney, Agent, or Firm* — Wolf, Greenfield & Sacks, P.C.

(57) ABSTRACT

A segmented traveling wave Mach Zehnder optical modulator is described. The segmented traveling wave Mach Zehnder optical modulator may comprise two or more radio frequency (RF) segments, and each RF segment may be configured to support a modulating RF signal. The modulating RF signals may be configured to modulate an optical signal propagating along an optical path of the segmented traveling wave Mach Zehnder optical modulator. The RF modulating signal in the second RF segment may be generated by amplifying the modulating RF signal of the first RF segment, using an RF amplifier. The RF amplifier may be configured to amplify a band-pass spectral portion of the modulating RF signal.

21 Claims, 10 Drawing Sheets

(56) References Cited

U.S. PATENT DOCUMENTS

| | | |
|---|---|---|
| 9,195,079 B2 | 11/2015 | Doerr et al. |
| 9,531,478 B2 | 12/2016 | Zheng et al. |
| 2002/0159738 A1* | 10/2002 | Aoki .................. G02F 1/0356 385/129 |
| 2003/0227666 A1 | 12/2003 | Bridges |
| 2011/0318016 A1 | 12/2011 | Wyss et al. |
| 2012/0163811 A1* | 6/2012 | Doany .................. H04B 10/40 398/41 |
| 2013/0176609 A1* | 7/2013 | Noguchi ............ H04B 10/5561 359/238 |
| 2013/0343693 A1 | 12/2013 | Doerr |
| 2014/0036937 A1 | 2/2014 | Doerr |
| 2014/0064659 A1 | 3/2014 | Doerr et al. |
| 2014/0112611 A1 | 4/2014 | Vermeulen et al. |
| 2014/0153931 A1 | 6/2014 | Doerr |
| 2015/0036965 A1* | 2/2015 | Prosyk .................. G02F 1/225 385/3 |
| 2015/0049978 A1 | 2/2015 | Fujikata et al. |
| 2015/0062689 A1 | 3/2015 | Doerr |
| 2015/0198859 A1 | 7/2015 | Chen |
| 2015/0212345 A1 | 7/2015 | Chen et al. |
| 2015/0229408 A1* | 8/2015 | Ding .................. H04B 10/505 398/188 |
| 2016/0013866 A1 | 1/2016 | Doerr |
| 2016/0041336 A1 | 2/2016 | Doerr et al. |
| 2016/0103382 A1 | 4/2016 | Liboiron-Ladouceur et al. |
| 2016/0218811 A1 | 7/2016 | Chen et al. |
| 2016/0308618 A9 | 10/2016 | Chen et al. |
| 2017/0285437 A1 | 10/2017 | Doerr et al. |

OTHER PUBLICATIONS

Papuchon et al., 4-Bits Digitally Driven Integrated Amplitude Modulator for Data Processing. Electron Lett. Feb. 14, 1980;16(4):142-4.

Shastri et al., Experimental Demonstration of Ultra-Low-Power Single Polarization 56 Gb/s QAM-16 Generation without DAC using CMOS Photonics. 2014 European Conference on Optical Communication (ECOC). Cannes, France. PD.2.5. Sep. 21-25, 2014. 3 pages.

International Search Report and Written Opinion dated Sep. 13, 2017 in connection to International Application No. PCT/US2017/038489.

* cited by examiner

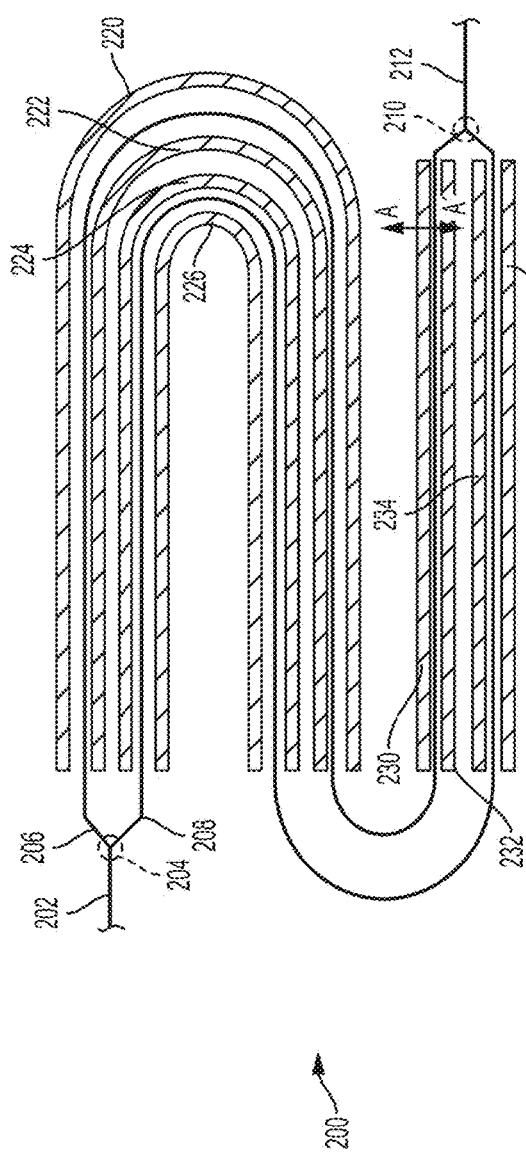
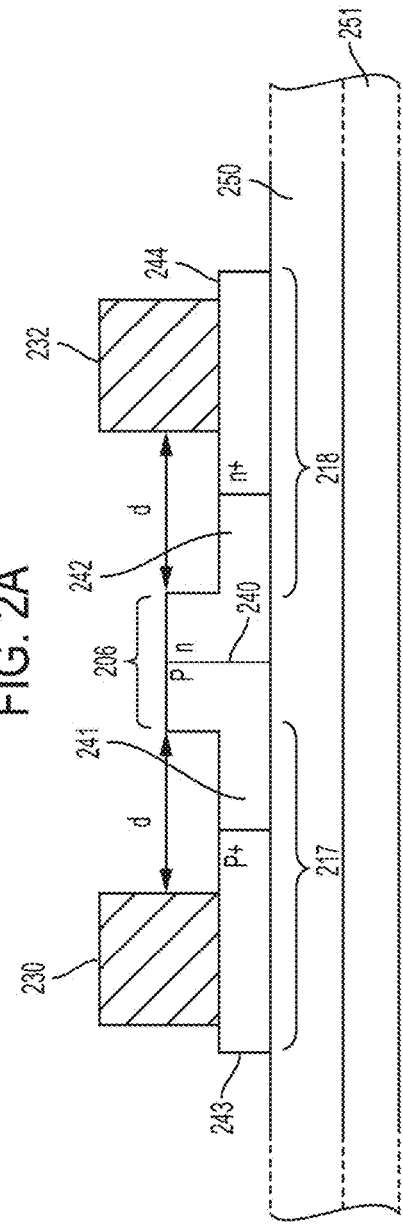
FIG. 2A
FIG. 2B

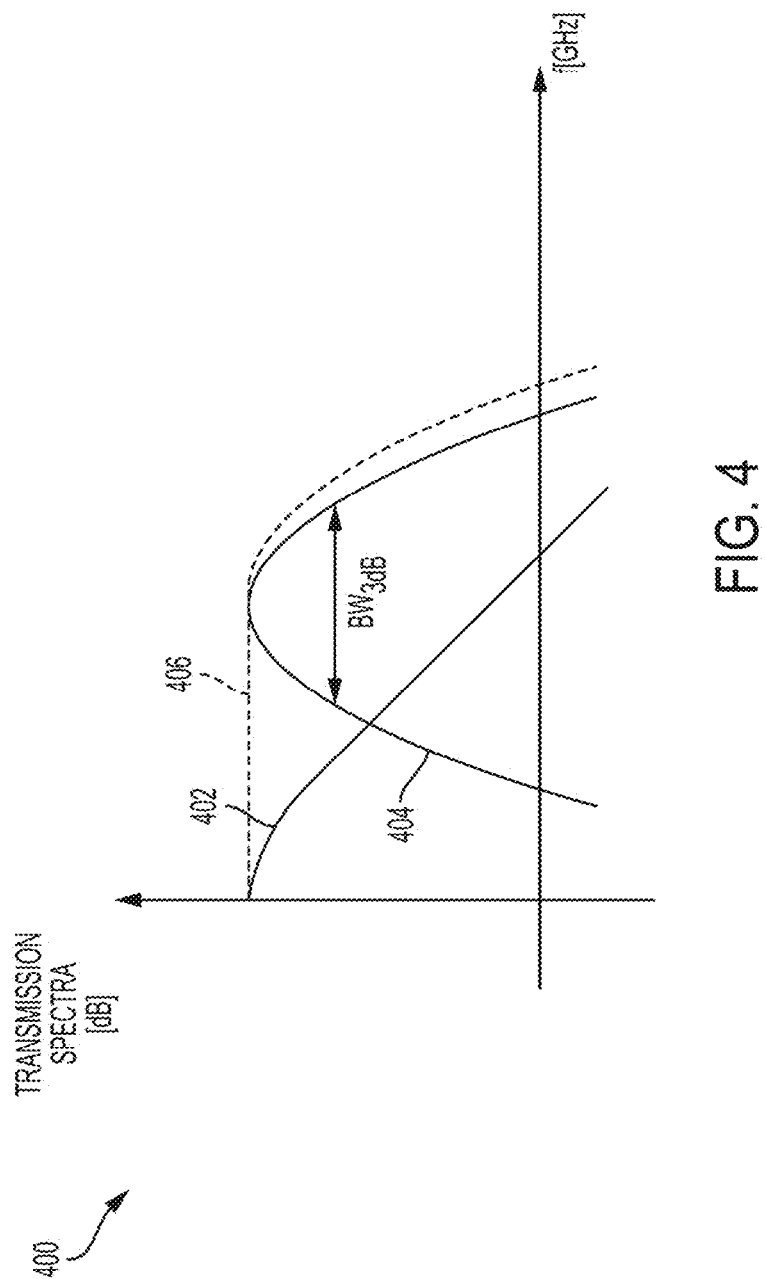

SEGMENTED TRAVELING WAVE OPTICAL MODULATORS AND RELATED METHODS

BACKGROUND

Field

The present application relates to traveling wave Mach Zehnder optical modulators.

Related Art

Traveling wave Mach Zehnder optical modulators include electronic drivers configured to modulate optical signals with radio frequency (RF) signals. Sometimes the optical modes propagate along the modulator with a speed that matches that of the modulating RF signals.

BRIEF SUMMARY

According to one aspect of the present application, a traveling wave optical modulator is provided. The traveling wave optical modulator may comprise tandem optical and radio frequency (RF) paths, the optical path being configured to support an optical signal and the RF path being a segmented RF path configured to support an RF signal and having a first RF segment and a second RF segment, wherein the first RF segment is configured to provide the RF signal to the second RF segment; and an RF amplifier coupled to an input of the second RF segment, wherein the segmented radio frequency (RF) path is disposed, at least in part, alongside the optical path.

According to another aspect of the present application, a method of operating an optical traveling wave modulator is provided. The optical traveling wave modulator may have first and second radio frequency (RF) segments. The method may comprise transmitting a first RF signal through the first RF segment of the optical traveling wave modulator, the first RF signal having a plurality of frequencies; modulating an optical signal propagating in an optical path of the optical traveling wave modulator with the first RF signal; outputting the first RF signal from the first RF segment; generating a second RF signal by amplifying a subset of the frequencies of the first RF signal; and transmitting the second RF signal through the second RF segment of the optical traveling wave modulator.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 2A illustrates schematically a segmented traveling wave Mach Zehnder optical modulator, according to some non-limiting embodiments.

FIG. 2B is a cross sectional view of a segmented traveling wave Mach Zehnder optical modulator, according to some non-limiting embodiments.

FIG. 4 is a plot illustrating the frequency response of a segmented traveling wave Mach Zehnder optical modulator, according to some non-limiting embodiments.

DETAILED DESCRIPTION

Applicant has appreciated that the modulation speed of a traveling wave Mach Zehnder optical modulator can be increased by amplifying a spectral portion of the RF modulating signal along the path of the RF signal. The modulation speed of a typical traveling wave Mach Zehnder modulator is limited by the frequency-dependent transmissivity associated with the RF path. Being a transmission line that feeds capacitors through resistive paths, the RF path exhibits a low-pass frequency response. Consequently, an RF modulating signal traveling in a typical traveling wave Mach Zehnder modulator experiences a propagation loss that increases with frequency. According to aspects of the present application, an amplifier positioned along the RF path of a traveling wave Mach Zehnder modulator may be configured to counteract the effect of the frequency-dependent transmissivity by amplifying a band-pass spectral portion of the RF modulating signal. By boosting at least a spectral portion of the RF signal that is attenuated, a higher modulation speed can be achieved.

Applicant has further appreciated that compensating for the low-pass response of an RF path by pre-amplifying the RF signal with an amplifier positioned upstream with respect to the RF path, may call for the use of dedicated voltage supplies. The voltage supplies may be configured to provide voltages large enough to allow for the pre-amplification of the RF-signal. Introducing such voltage supplies may be impractical in some circumstances. For example, integrated circuits fabricated using complementary metal-oxide-semiconductor (CMOS) fabrication techniques may be configured to support only voltages below a certain threshold. Accordingly, the voltage provided by the supply may exceed such a threshold. The threshold may depend on the technological node in use in the particular CMOS fabrication process.

According to an aspect of the present application, the voltage used to drive the compensating amplifier may be reduced by segmenting the RF path of the traveling wave Mach Zehnder modulator and by positioning the compensating amplifier between segments of the segmented RF path. In this configuration, the RF signal may be amplified at a location along the RF path where it may already have experienced partial attenuation. Consequently, the voltage driving the amplifier may be reduced compared to the case where the amplification is performed upstream with respect to the RF path.

The aspects and embodiments described above, as well as additional aspects and embodiments, are described further below. These aspects and/or embodiments may be used individually, all together, or in any combination of two or more, as the application is not limited in this respect.

Figure 1:
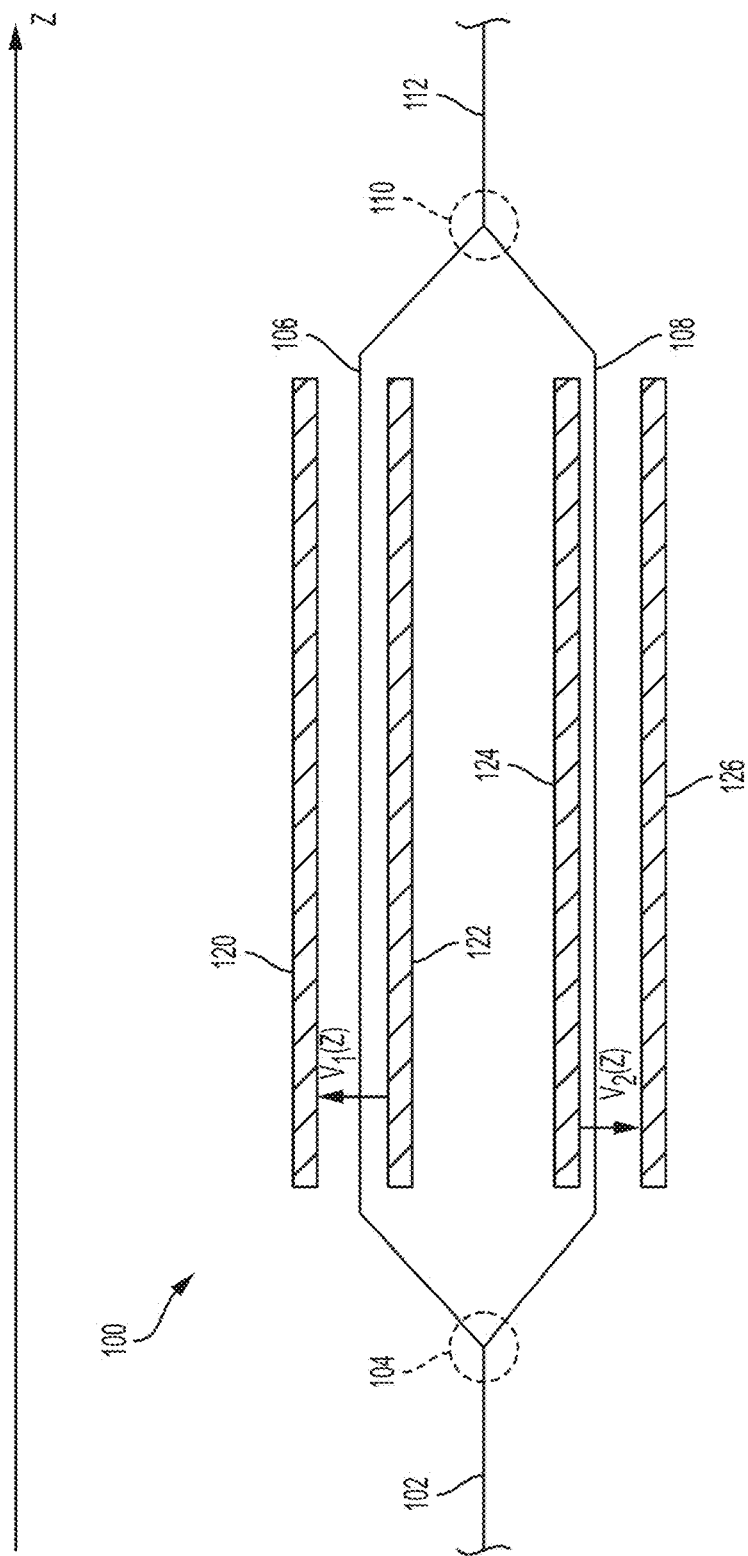
FIG. 1 illustrates schematically a conventional traveling wave Mach Zehnder optical modulator.

The modulation speed of conventional traveling wave Mach Zehnder modulators is limited by the frequency-dependent transmissivity associated with the RF path, and by the low-pass frequency response exhibited by the RF path. As a consequence, an RF modulating signal traveling in a conventional traveling wave Mach Zehnder modulator experiences a propagation loss that increases with frequency. FIG. 1 illustrates a conventional traveling wave Mach Zehnder optical modulator 100. Traveling wave Mach Zehnder optical modulators may be referred to herein simply as "modulators". The modulator 100 comprises an input waveguide 102 and an output waveguide 112. Input waveguide 102 is connected to an optical coupler 104, such as a 3 dB optical coupler. Output waveguide 112 is connected to a coupler 110, such as a 3 dB optical coupler. An optical waveguide 106, referred to herein as the "first optical arm", is connected to, and disposed between, couplers 104 and 110. An optical waveguide 108, referred to herein as the "second optical arm", is connected to, and disposed between, couplers 104 and 110. Input waveguide 102, first optical arm 106, second optical arm 108 and output waveguide 112 define an optical path.

In some circumstances, electrodes 120 and 122 are disposed on either side of first optical arm 106, and electrodes 124 and 126 are disposed on either side of second optical arm 108. Electrodes 120 and 122 support a first radio frequency (RF) signal, which modulates the phase of an optical signal propagating along the first optical arm 106. Similarly, electrodes 124 and 126 support a second RF signal, which modulates the phase of an optical signal propagating along the first optical arm 106. The first and second RF signals include a first voltage $V_1(z)$ and a second voltage $V_2(z)$, respectively, which can be functions of the coordinate z along the optical propagation axis. Typically $V_1(z)=-V_2(z)+$constant. The first RF signal and the second RF signal collectively define a differential RF signal. The RF signals co-propagate with the corresponding optical signals. For example, the signal $V_1(z)$ may comprise a traveling wave that overlaps in time and space with an optical signal propagating along the first optical arm 106. Co-propagation of the RF signal with the optical signal is achieved by matching their group velocities. Electrodes 120, 122, 124 and 126 collectively define an RF path.

The modulation speed associated with modulator 100 may be limited by the fact that the RF signals experience attenuation along the RF path, i.e., along the z-axis. In some circumstances, the RF path may exhibit a low-pass frequency response, thus attenuating the high frequencies by a greater amount than the low frequencies. As a consequence, modulation rates exceeding a certain threshold which may depend on various design parameters such as the length of the RF path, give rise to distorted optical modulated signals. This phenomenon underlies a design trade off with respect to the length of the RF path. Shortening the RF path reduces the amount of modulation, increasing the device insertion loss. Lengthening the RF path may exacerbate the low-pass frequency response, limiting the modulation speed.

According to one aspect of the present application, by segmenting the RF path of a traveling wave Mach Zehnder modulator, greater modulation speeds may be achieved. In this way, the propagation loss experienced along each segment of the RF path may be less than the propagation loss experienced along an entire unsegmented modulator. In some embodiments, the RF modulating signal may be boosted, using an amplifier, between successive segments. Traveling wave Mach Zehnder modulators comprising at least two RF segments may be referred to herein as "segmented traveling wave Mach Zehnder modulators" or simply "segmented modulators".

FIG. 2A illustrates schematically a segmented traveling wave Mach Zehnder modulator having a first RF segment and a second RF segment. However, the application is not limited in this respect and any suitable number of two or more RF segments may be used. Segmented modulator 200 may comprise an input waveguide 202 and an output waveguide 212. Input waveguide 202 may be connected to an optical coupler 204, such as a 3 dB optical coupler. Output waveguide 212 may be connected to a coupler 210, such as a 3 dB optical coupler. An optical waveguide 206, referred to herein as the "first optical arm", may be connected to, and disposed between, couplers 204 and 210. An optical waveguide 208, referred to herein as the "second optical arm", may be connected to, and disposed between, couplers 204 and 210. Input waveguide 202, first optical arm 206, second optical arm 208 and output waveguide 212 may define an optical path. In some embodiments, the first and the second optical arm may comprise one or more curved portions. In the non-limiting example illustrated in FIG. 2A, each optical arm comprises two curved portions. However, the application is not limited is this respect, and a segmented modulator 200 may comprise any other suitable number of curved portions.

In some embodiments, electrodes 220 and 222 may be disposed on either side of first optical arm 206, and electrodes 224 and 226 may be disposed on either side of second optical arm 208. Electrodes 220, 222, 224 and 226 may collectively define a first RF segment. Electrodes 220 and 222 may be configured to support a first RF signal, which may be configured to modulate the phase of an optical signal propagating along the first optical arm 206. Similarly, electrodes 224 and 226 may be configured to support a second RF signal, which may be configured to modulate the phase of an optical signal propagating along the second optical arm 206.

In some embodiments, electrodes 230 and 232 may disposed on either side of first optical arm 206, and electrodes 234 and 236 may be disposed on either side of second optical arm 208. Electrodes 230, 232, 234 and 236 may collectively define a second RF segment, following the first RF segment with respect to the RF propagation axis. Electrodes 230 and 232 may be configured to support a third RF signal, which may be derived from the first RF signal and may be configured to modulate the phase of an optical signal propagating along the first optical arm 206. Similarly, electrodes 234 and 236 may be configured to support a fourth RF signal, which may be derived from the second RF signal and may be configured to modulate the phase of an optical signal propagating along the first optical arm 206.

In some embodiments, the third and fourth RF signals may be generated by amplifying the first and second RF signals, respectively, using an amplifier (not shown in FIG.

2A) disposed along the RF path between the first RF segment and the second RF segment.

The optical path and the RF segmented path may be configured such that the RF signal propagating along the RF segmented path can modulate optical signals propagating along the optical path. In some embodiments, the RF segmented path may be disposed alongside the optical path. For example, the RF segmented path may be disposed within a distance equal to 100 wavelengths of the optical signal with respect to the optical path. In some embodiments, the RF segmented path may track the optical path. In some embodiments, the RF segmented path may be adjacent the optical path. Because the two paths are configured to operate in connection with each other, the paths can be considered to be configured in a tandem arrangement, for example referred to as a tandem optical-RF path.

FIG. 2B is a cross sectional view of segmented modulator 200 taken along the AA' line of FIG. 2A. As illustrated, segmented modulator 200 may comprise bottom cladding 250, which may be disposed on a substrate 251, such as a silicon substrate or an indium phosphide substrate. In some embodiments, the substrate may comprise a silicon-on-insulator (SOI) substrate. In some embodiments, a film of dielectric material, such as silicon, may be disposed on top of the bottom cladding. The dielectric film may be patterned to form optical waveguide 206. In some embodiments, regions of the dielectric film adjacent the optical waveguide 206 may be partially etched to form shallow dielectric regions 217 and 218. In some embodiments, optical waveguide 206 may comprise a pn-junction. In the non-limiting example illustrated in FIG. 2B the optical waveguide comprises a pn-junction formed by doping region 242 with an n-doping material, such as phosphorus or arsenic, and region 241 with a p-doping material, such as boron. While the junction 240 is located approximately at the center of optical waveguide 206, other configurations are also possible. Region 243, adjacent region 241, may be highly doped with a p-doping material. For example, region 243 may be doped with a concentration of dopants that is between $10^{19}$ cm$^{-3}$ and $10^{21}$ cm$^{-3}$, including any range or value within that range. Region 244, adjacent region 242, may be highly doped with an n-doping material. For example, region 244 may be doped with a concentration of dopants that is between $10^{19}$ cm$^{-3}$ and $10^{21}$ cm$^{-3}$, including any range or value within that range. In some embodiments, electrodes 230 and 232 may be disposed on top of regions 243 and 244 respectively. The highly doped regions may be configured to form ohmic contacts with electrodes 230 and 232.

Electrodes 230 and 232 may be disposed at a suitable distance d from the optical waveguide 206 to allow for modulation of the optical signal. Distance d may be between 500 nm and 50 µm in some embodiments, between 1 µm and 50 µm in some embodiments, between 1 µm and 20 µm in some embodiments, between 1 µm and 10 µm in some embodiments, between 1 µm and 5 µm in some embodiments, between 2 µm and 4 µm in some embodiments, or may assume any value within any of these ranges or other suitable ranges. In other embodiments, the distance between electrode 230 and optical waveguide 206 may differ from the distance between electrode 232 and optical waveguide 206.

In the non-limiting example illustrated in FIG. 2B, the p-doped region and the n-doped region are disposed beside one another to form a vertical junction 240. In other embodiments, a p-doped region and an n-doped region may be configured to form a horizontal junction.

The device illustrated in FIG. 2B may be configured to operate as a phase shifter. In some embodiments, by injecting electric carriers into optical waveguide 206, the phase of an optical signal propagating along optical waveguide 206 may be shifted with respect to thermal equilibrium. Injection of carriers may be achieved by forward biasing the pn-junction using electrodes 230 and 232. In some embodiments, by depleting waveguide 206 from electric carriers, the phase of an optical signal propagating along optical waveguide 206 may be shifted with respect to thermal equilibrium. Depletion of carriers in all or part of the waveguide may be achieved by reverse biasing the pn-junction using electrodes 230 and 232. Referring back to FIG. 2A, the two optical arms of segmented modulator 200 may work in tandem with the corresponding electrodes to form phase shifters. Amplitude modulation may be achieved by shifting the phase of an optical signal traveling along the first optical arm with respect to an optical signal traveling along the second optical arm.

Figure 3:
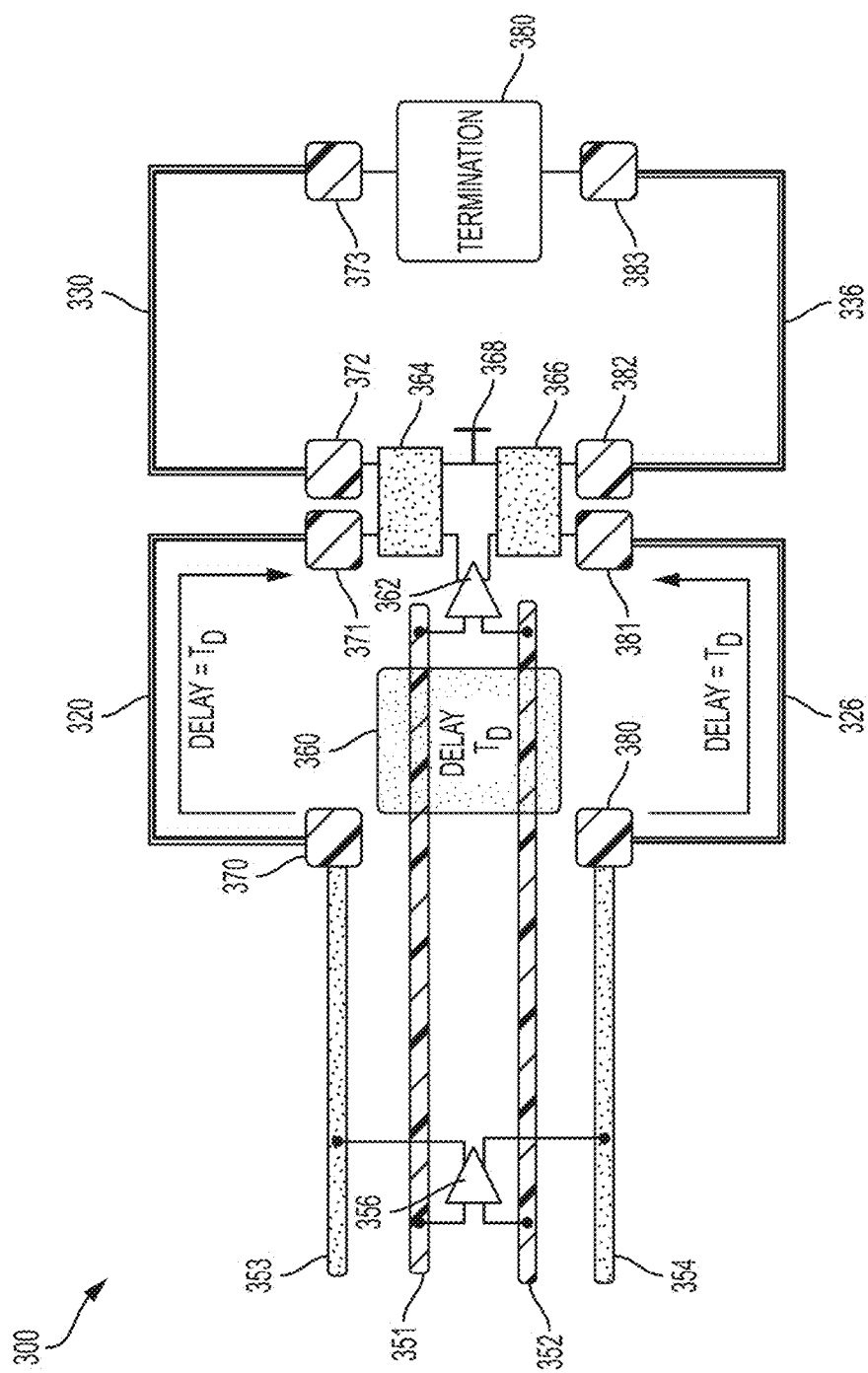
FIG. 3 illustrates schematically a driver for a segmented traveling wave Mach Zehnder optical modulator comprising at least one amplifier, according to some non-limiting embodiments.

As described above, an RF amplifier may be used to amplify the modulating RF signals that exit the first RF segment. The amplified signals may be coupled to the second RF path, thus counteracting the effect of RF propagation loss. FIG. 3 illustrates schematically a driver for a segmented traveling wave Mach Zehnder optical modulator comprising at least one amplifier, according to some non-limiting embodiments. Driver 300 may comprise amplifier 362, amplifier 356, RF delay element 362, couplers 364 and 366, and termination 366. Transmission line 320 may collectively represent electrodes 220 and 222. Transmission line 326 may collectively represent electrodes 224 and 226. Transmission line 330 may collectively represent electrodes 230 and 232. Transmission line 336 may collectively represent electrodes 234 and 236. The ends of transmission line 320, or at least of one of its electrodes, may be connected to pads 370 and 371, respectively. The ends of transmission line 330, or at least of one of its electrodes, may be connected to pads 372 and 373, respectively. The ends of transmission line 326, or at least of one of its electrodes, may be connected to pads 380 and 381, respectively. The ends of transmission line 336, or at least of one of its electrodes, may be connected to pads 382 and 383, respectively. In some embodiments, an RF signal propagating along transmission line 320 may accumulate an RF delay $T_D$. In some embodiments, an RF signal propagating along transmission line 326 may accumulate an RF delay $T_D$.

In some embodiments, transmission line 353 may be connected to pad 370, and may be configured to couple a modulating RF signal to transmission line 320. In some embodiments, transmission line 354 may be connected to pad 380, and may be configured to couple a modulating RF signal to transmission line 326. In some embodiments, transmission line 353 may be connected to transmission line 351. For example, transmission line 351 may be connected to an input of amplifier 356, and transmission line 353 may be connected to an output of amplifier 356. In some embodiments, transmission line 354 may be connected to transmission line 352. For example, transmission line 352 may be connected to an input of amplifier 356, and transmission line 354 may be connected to an output of amplifier 356. Amplifier 356 may be configured to amplify a pair of RF signals, which may collectively represent an input RF differential signal in some embodiments, and to provide the amplified RF signals to transmission lines 353 and 354.

In some embodiments, transmission lines 351 and 352 may be coupled to an RF delay element 360. The RF delay element may be configured to delay the RF signals coupled through transmission lines 351 and 352 by approximately $T_D$. For example, the delay introduced by RF delay element 360 may be equal to $T_D$, or may have a mismatch that is less than 5% of $T_D$ in some embodiments, less than 3% of $T_D$ in some embodiments, less than 2% of $T_D$ in some embodiments, or less than 1% of $T_D$ in some embodiments. In some embodiments, the mismatch may be equal to or less than an inverse of the modulating frequency. RF delay element 360 may be controllable in such embodiments, and may be connected to a control circuit (not shown in FIG. 3). The control circuit may be configured to vary the delay associated with RF delay element 360 to make it approximately equal to $T_D$. In some embodiments, RF delay element 360 may comprise a controllable variable capacitor.

In some embodiments, the outputs of RF delay element 362 may be coupled to inputs of amplifier 362. Amplifier 362 may be configured to amplify modulating RF signals provided through transmission lines 351 and 353, and may be configured to couple the amplified modulating RF signals to transmission lines 330 and 336, via couplers 364 and 366, respectively. Coupler 364 may comprise a first input port connected to transmission line 320, a second input port connected to an output of amplifier 362, a first output port connected to transmission line 330, and a second output port connected to terminal 368, which may be connected to a reference potential, such as a ground potential. Coupler 366 may comprise a first input port connected to transmission line 326, a second input port connected to an output of amplifier 362, a first output port connected to transmission line 336, and a second output port connected to terminal 368.

In some embodiments, amplifier 362 and couplers 364 and 366 may be configured to counteract the frequency-dependent RF propagation loss of the first and/or second RF segment, by amplifying a spectral portion of the modulating RF signals. FIG. 4 is a plot illustrating an exemplary frequency response of a segmented traveling wave Mach Zehnder optical modulator of the type described herein, according to some non-limiting embodiments. Plot 400 illustrates transmission spectra in dB as a function of frequency in GHz. Curve 402 is an exemplary response of an RF segment, such as the first or the second RF segment illustrated in FIG. 3. The RF segment may exhibit a low-pass frequency response, and may have a 3 dB-bandwidth that is less than 30 GHz in some embodiments, less than 20 GHz in some embodiments, less than 10 GHz in some embodiments, or less than any other suitable frequency. Couplers 364 and 366 may exhibit band-pass frequency responses, as illustrated by curve 404. Curve 404 may have a central frequency that is between 10 GHz and 50 GHz in some embodiments, between 20 GHz and 30 GHz in some embodiments, or between any other suitable values or range of values. Other values are also possible. Curve 404 may have an optical bandwidth $BW_{3\ dB}$ that is between 5 GHz and 60 GHz in some embodiments, between 10 GHz and 60 GHz in some embodiments, between 10 GHz and 40 GHz in some embodiments, between 10 GHz and 30 GHz in some embodiments, between 15 GHz and 30 GHz in some embodiments, between 20 GHz and 25 GHz in some embodiments, or any value or range of values within such ranges. Other values are also possible. Curve 406 represents an exemplary frequency response of the segmented modulator described herein. The segmented modulator may exhibit a low-pass frequency response, and may have a 3 dB-bandwidth that is greater than the 3 dB-bandwidth of the RF segments. For example, the segmented modulator may have a 3 dB-bandwidth that is greater than 12 GHz in some embodiments, greater than 15 GHz in some embodiments, greater than 20 GHz in some embodiments, greater than 25 GHz in some embodiments, greater than 30 GHz in some embodiments, greater than 35 GHz in some embodiments, greater than 40 GHz in some embodiments, greater than 45 GHz in some embodiments, greater than 50 GHz in some embodiments, between 12 GHz and 50 GHz, or any value or range of values within such ranges.

Referring back to FIG. 3, the amplified modulating RF signals may be coupled to transmission lines 330 and 336. Transmission lines 330 and 336 may be terminated with termination 380, such as a 50Ω differential termination or a 75Ω differential termination. In some embodiments, transmission line 320 may be connected to an input of an amplifier configured to counteract the low-pass frequency response of the transmission line 320. The output of such an amplifier may be connected to transmission line 330. In some embodiments, transmission line 326 may be connected to an input of an amplifier configured to counteract the low-pass frequency response of the transmission line 326. The output of such an amplifier may be connected to transmission line 336.

While the non-limiting example of FIG. 3 illustrates amplifier 362 coupled to an output of RF delay element 360, the order in which they appear may be swapped in some embodiments. In such embodiments, RF delay element 360 may be coupled between amplifier 362 and couplers 364 and 366.

Figure 5A:
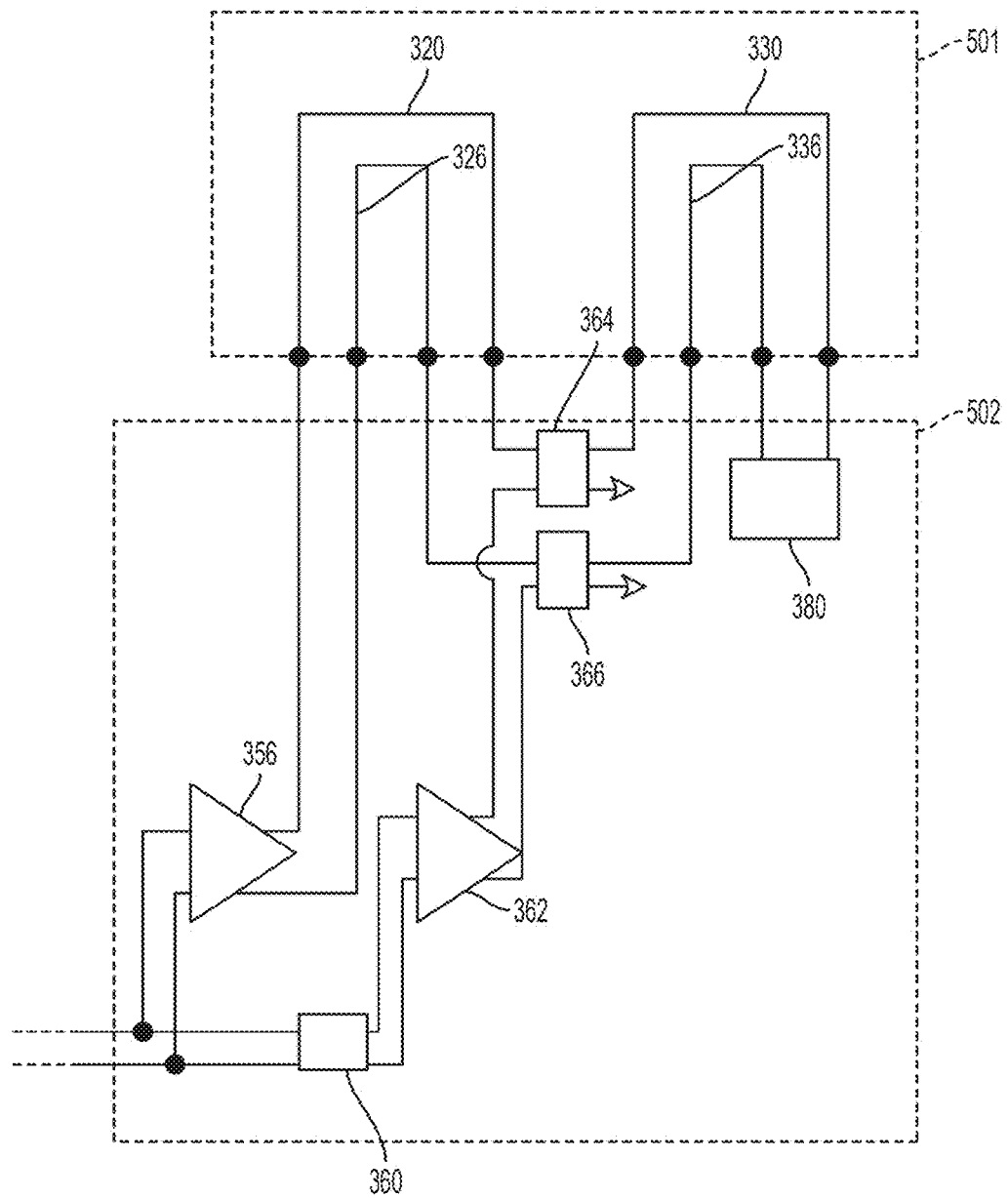
FIG. 5A illustrates schematically a driver for a segmented traveling wave Mach Zehnder optical modulator having at least one coupler disposed on a driver chip, according to some non-limiting embodiments.

A segmented traveling wave Mach Zehnder modulator of the type described herein may be disposed on a first chip, which will be referred to herein as the "photonic chip". The photonic chip may comprise a silicon substrate in some embodiments. A driver for a segmented traveling wave Mach Zehnder modulator, such as driver 300, may be disposed on a second chip, which will be referred to herein as the "driver chip". The driver chip may comprise a silicon substrate in some embodiments. FIG. 5A illustrates schematically an exemplary arrangement in which a segmented modulator of the type described herein is disposed on a photonic chip 501, and the driver is disposed on a driver chip 502. Photonic chip 501 may comprise transmission lines 320, 326, 330 and 336, and the corresponding optical waveguides. Driver chip 502 may comprise amplifier 356, RF delay element 360, amplifier 362, couplers 364 and 366, and termination 380.

Figure 5B:
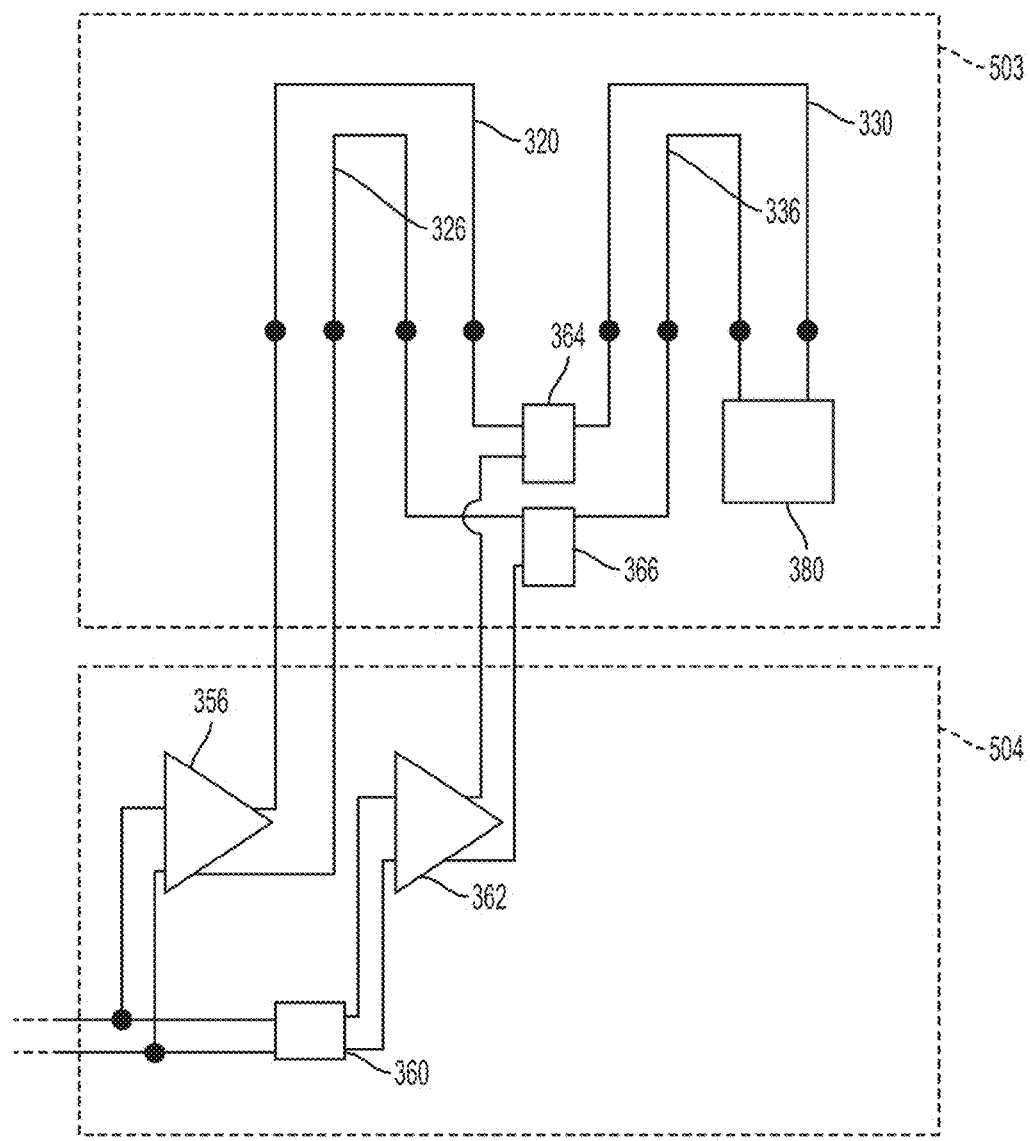
FIG. 5B illustrates schematically a driver for a segmented traveling wave Mach Zehnder optical modulator having at least one coupler disposed on a photonic chip, according to some non-limiting embodiments.

In other embodiments, the couplers may be disposed on the photonic chip. FIG. 5B illustrates schematically an alternative arrangement in which a segmented modulator of the type described herein is disposed on a photonic chip 503, and its driver is disposed on a driver chip 504. Photonic chip 503 may comprise transmission lines 320, 326, 330 and 336, and the corresponding optical waveguides. Photonic chip 503 may further comprise couplers 364 and 366, and termination 380. Driver chip 504 may comprise amplifier 356, RF delay element 360 and amplifier 362.

Figure 6A:
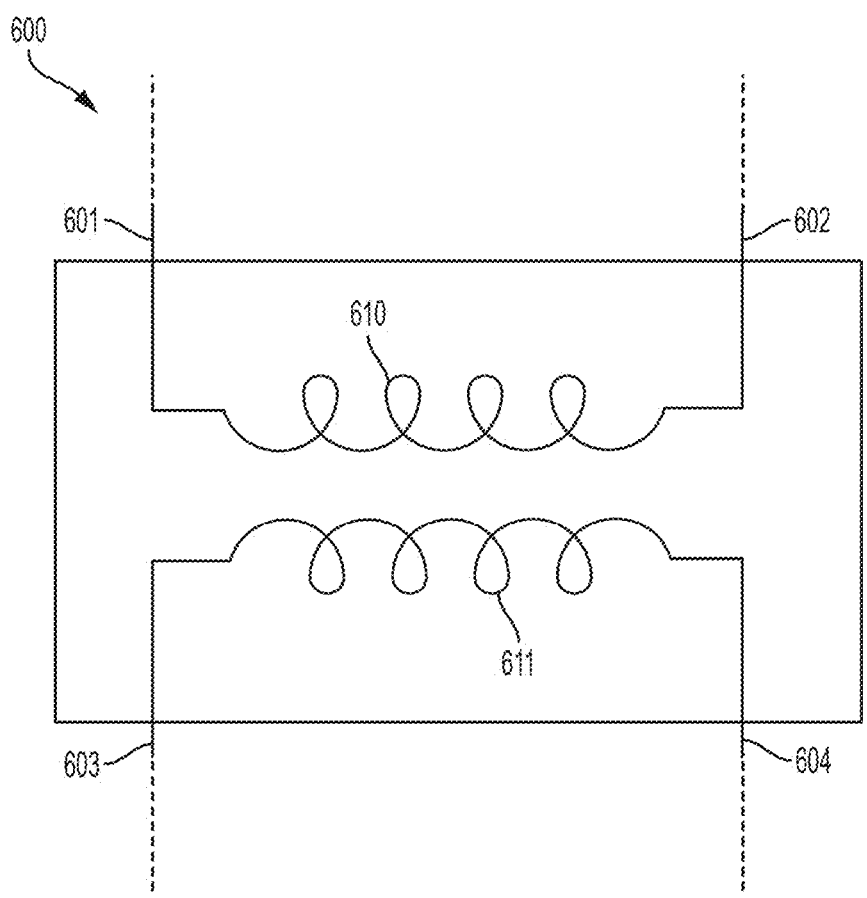
FIG. 6A illustrates schematically an exemplary transformer, according to some non-limiting embodiments.

As described above, couplers 364 and 366 may be configured to couple signals between the input and the output ports according to a band-pass frequency response. In some embodiments, couplers 364 and 366 may each comprise an electromagnetic coupler. In some embodiments, couplers 364 and 366 may each comprise a transmission line. In some embodiments, couplers 364 and 366 may each comprise a transformer. FIG. 6A illustrates schematically an exemplary transformer 600, according to some non-limiting embodiments. Transformer 600 may comprise terminals 601, 602, 603 and 604, and inductors 610 and 611. Inductor 610 may be connected to terminals 601 and 602, and inductor 611 may be connected to terminals 603 and 604. Inductors 610 and 611 may be mutually magnetically coupled. In some embodiments, transformer 600 may serve as coupler 364 and terminal 601 may be connected to pad 371, terminal 602 may be connected to pad 372, terminal 603 may be connected to an output of amplifier 362, and terminal 604 may be connected to terminal 368. In some embodiments, transformer 600 may serve as coupler 366 and terminal 601 may be connected to an output of amplifier 362, terminal 602 may be connected to terminal 368, terminal 603 may be connected to pad 381, and terminal 604 may be connected to pad 382. Transformer 600 may be configured to provide the frequency response represented by curve 404 in FIG. 4.

Figure 6B:
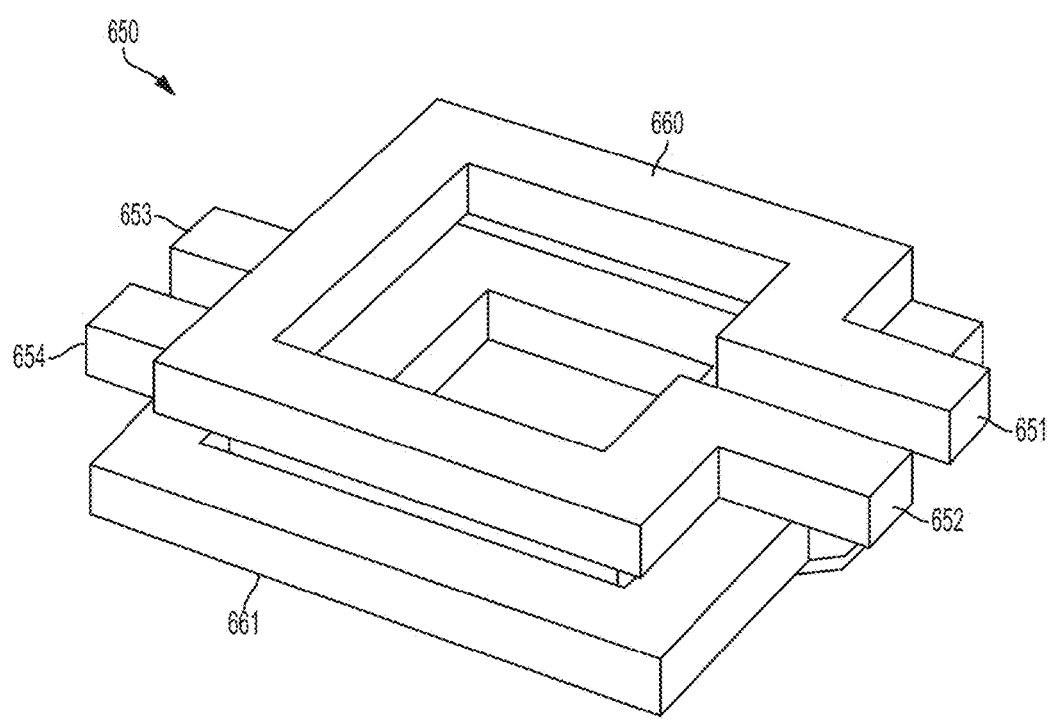
FIG. 6B illustrates schematically an exemplary transformer having a first portion formed on a first metal level and a second portion formed on a second metal level, according to some non-limiting embodiments.

One non-limiting implementation of transformer 600 is illustrated in FIG. 6B. Transformer 650 may comprise a first coil 660, serving for example as inductor 610, and a second coil 661, serving for example as inductor 611. However, the opposite configuration is also possible. Coil 660 may be formed by patterning a loop on a first metal level of the chip on which transformer 650 is disposed. Coil 660 may comprise terminals 651 and 652, which may serve as terminals 601 and 602, respectively. Coil 660 may be formed by patterning a loop on a second metal level of the chip on which transformer 650 is disposed. Coil 661 may comprise terminals 653 and 654, which may serve as terminals 603 and 604, respectively. Coil 660 and coil 661 may be configured to be mutually magnetically coupled.

Figure 7:
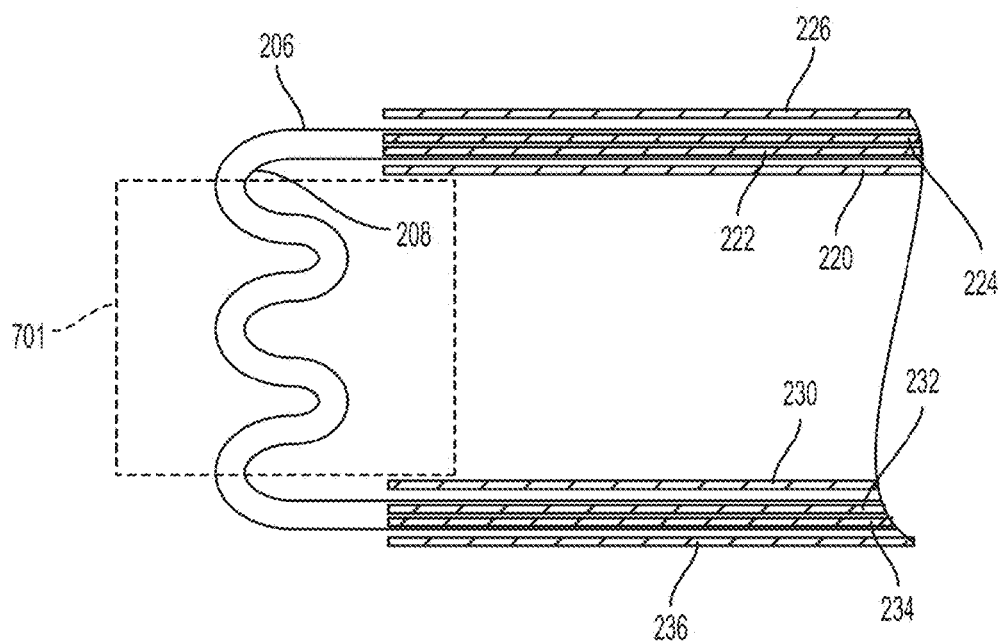
FIG. 7 illustrates schematically a portion of a segmented Mach Zehnder optical modulator comprising an optical delay element, according to some embodiments.

Segmented traveling wave Mach Zehnder modulators of the type described herein may operate by modulating a traveling optical signal propagating along an optical path with a traveling RF signal propagating along a segmented RF path. In at least some embodiments, to ensure overlapping of the optical signal with the modulating RF signal propagating along the second RF segment, the optical signal may be delayed with respect to the modulating RF signal. FIG. 7 illustrates schematically a portion of a segmented traveling wave Mach Zehnder optical modulator comprising an optical delay element, according to some embodiments. In some embodiments, optical delay element 701 may be disposed along the optical path and between the first RF segment and the second RF segment. By way of example and not limitation, optical delay element 701 may comprise a non-straight waveguide portion, and may comprise one or more curved waveguide portions. For example, a non-straight waveguide portion may comprise a bend or a curvilinear waveguide. Optical delay element 701 may be configured to exhibit an optical delay such that the optical signal overlaps, at least in part, with the RF signal amplified by amplifier 362. In some embodiments, the optical delay element 701 may comprise a controllable optical delay element. In such embodiments, the amount of optical delay introduced may be adjusted by a controller (not shown in FIG. 7). An exemplary controllable optical delay element may comprise a phase shifter, a ring resonator, a heater, or any other suitable optical component.

As described above, a segmented modulator of the type described herein may be disposed on a photonic chip and the driver may be disposed on a driver chip. In some embodiments, the photonic chip and the driver chip may be disposed on the same substrate, such as an interposer or a printed circuit board (PCB). In some embodiments, the driver may be connected to the segmented modulator via wire bonds disposed between the driver chip and the photonic chip. Pads 370, 371, 372, 373, 380, 381, 382, and 383 may be connected to corresponding wire bonds.

Figure 8:
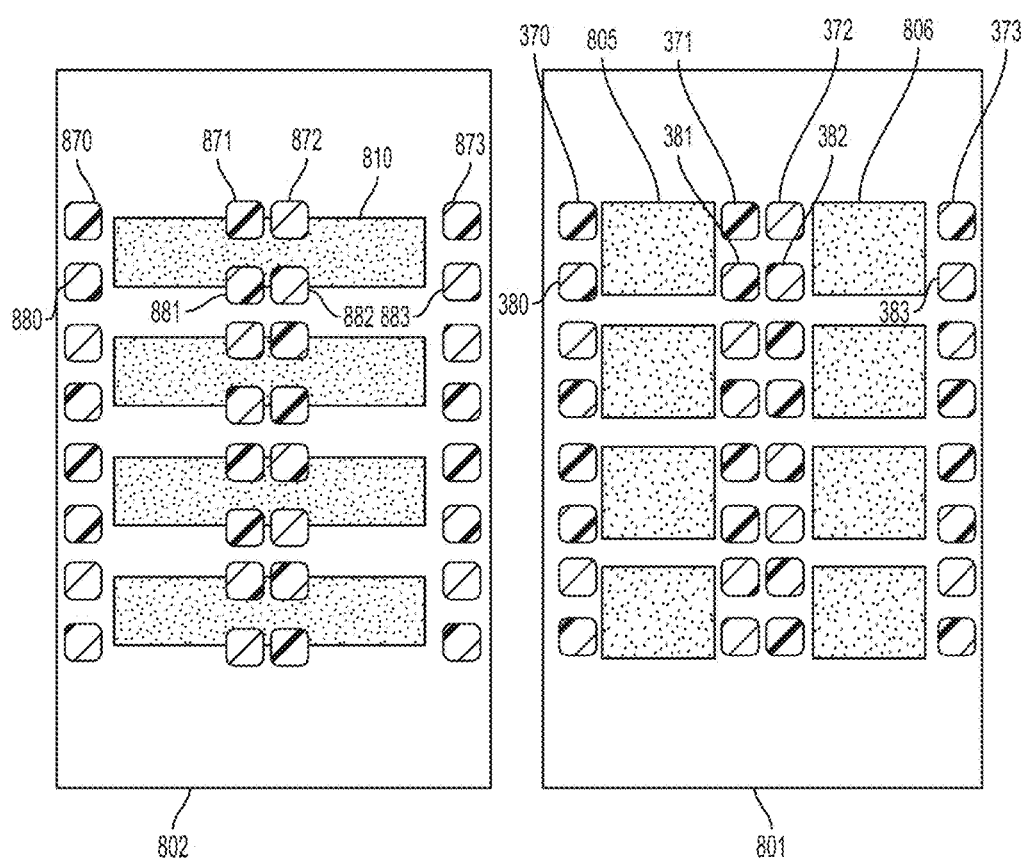
FIG. 8 illustrates schematically a photonic chip comprising a segmented traveling wave Mach Zehnder optical modulator and a driver chip comprising a driver for the segmented traveling wave Mach Zehnder optical modulator, according to some non-limiting embodiments.

In other embodiments, a photonic chip comprising a segmented modulator may be flip-chip bonded to a driver chip comprising the driver for the segmented modulator. Compared to wire bonds, flip-chip bonds may exhibit a lower inductance, and correspondingly, a lower time delay. Furthermore, flip-chip bonds may exhibit a more uniform inductance distribution across the chip, as compared to wire bonds. Moreover, flip-chipping avoids the need to bring signals to the edge of the die, allowing for a more compact geometry, especially in the case of multiple modulators in parallel. FIG. 8 illustrates schematically a photonic chip comprising a segmented traveling wave Mach Zehnder optical modulator and a driver chip comprising a driver for the segmented traveling wave Mach Zehnder optical modulator, according to some non-limiting embodiments. In some embodiments, photonic chip 801 may comprise a plurality of segmented modulators of the type described herein. At least one of such modulators, may comprise a first RF segment 805 and a second RF segment 806. The first RF segment 805 may comprise transmission lines 320 and 326, and the second RF segment 806 may comprise transmission lines 330 and 336. As illustrated in further detail in FIG. 3, the first RF segment 805 may be connected to pads 370, 371, 380, and 381, and the second RF segment 806 may be connected to pads 372, 373, 382, and 383. Photonic chip 801 may serve as photonic chip 501 of FIG. 5A or photonic chip 503 of FIG. 5B.

Driver chip 802 may serve as driver chip 502 of FIG. 5A or driver chip 504 of FIG. 5B. A first output of amplifier 356 may be connected to pad 870 and a second output of amplifier may be connected to pad 880. Alternatively, pads 870 and 880 may be connected to transmission lines 351 and 352, respectively. An input of coupler 366 may be connected to pad 881 and an input of coupler 364 may be connected to pad 871. An output of coupler 366 may be connected to pad 882 and an output of coupler 364 may be connected to pad 872. Inputs of termination 380 may be connected to pads 373 and 383. In some embodiments, photonic chip 801 may be flip-chip bonded to driver chip 502, such that pads 370, 371, 372, 373, 380, 381, 382 and 383 form electrical contacts with pads 870, 871, 872, 873, 880, 881, 882 and 883 respectively. Bonding of the pads may be achieved with pillars, such as copper pillars, ball grid arrays (BGA), or using any other suitable surface-mounting packaging technique known in the art. In some embodiments, photonic chip 801 may be flipped on driver chip 802. However, the opposite arrangement is also possible.

Aspects of the present application may provide one or more benefits, some of which have been previously described. Now described are some non-limiting examples of such benefits. It should be appreciated that not all aspects and embodiments necessarily provide all of the benefits now described. Further, it should be appreciated that aspects of the present application may provide additional benefits to those now described.

Aspects of the present application provide segmented traveling wave Mach Zehnder optical modulators having increased modulation speeds with respect to conventional traveling wave Mach Zehnder optical modulators. For example, a segmented traveling wave Mach Zehnder optical modulator of the type described herein may be configured to modulate optical signals with a modulation speed exceeding 20 GHz in some embodiments, 30 GHz in some embodiments, 40 GHz in some embodiments, or 50 GHz in some embodiments.

Aspects of the present application provide a segmented traveling wave Mach Zehnder modulator, having a length significantly greater than those associated with conventional modulators. Unlike conventional traveling wave modulators, the length of a segmented traveling wave modulator of the type described herein may be extended without decreasing the modulation speed. Consequently, lower modulation loss may be achieved.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The invention claimed is:

1. A traveling wave optical modulator comprising:
    tandem optical and radio frequency (RF) paths, the optical path having a first length and a second length and being configured to support an optical signal and the RF path being a segmented RF path configured to support an RF signal and having a first RF segment substantially following a shape of the first length of the optical path and a second RF segment substantially following a shape of the second length of the optical path, wherein the first RF segment is configured to provide the RF signal to the second RF segment; and
    an RF amplifier coupled to an input of the second RF segment.

2. The apparatus of claim 1, wherein the RF amplifier is coupled to the input of the second RF segment through a coupler, the coupler comprising:
    a first input connected to an output of the RF amplifier;
    a second input coupled to an output of the first RF segment; and
    an output coupled to the input of the second RF segment.

3. The apparatus of claim 2, wherein the coupler comprises a transformer.

4. The apparatus of claim 2, wherein the coupler comprises an electromagnetic coupler.

5. The apparatus of claim 2, wherein the optical path is integrated on a first chip and the RF amplifier is integrated on a second chip.

6. The apparatus of claim 5, wherein the first chip and the second chip are flip-chip bonded.

7. The apparatus of claim 5, wherein the coupler is on the first chip.

8. The apparatus of claim 5, wherein the coupler is on the second chip.

9. The apparatus of claim 2, wherein the coupler exhibits an optical bandwidth that is between 10 GHz and 60 GHz.

10. The apparatus of claim 1, further comprising an RF delay element coupled to the RF amplifier.

11. The apparatus of claim 10, wherein the RF delay element is controllable.

12. The apparatus of claim 10, wherein the RF delay element comprises a controllable variable capacitor.

13. The apparatus of claim 1, further comprising an optical delay element disposed along the optical path in a region between the first RF segment and the second RF segment.

14. The apparatus of claim 13, wherein the optical delay element comprises a non-straight waveguide portion.

15. A method of operating an optical traveling wave modulator having first and second radio frequency (RF) segments and an optical path having first and second lengths, the method comprising:
    transmitting a first RF signal through the first RF segment of the optical traveling wave modulator, the first RF signal having a plurality of frequencies, wherein the first RF segment substantially follows a shape of the first length of the optical path;
    modulating an optical signal propagating in the first length of the optical path of the optical traveling wave modulator with the first RF signal;
    outputting the first RF signal from the first RF segment;
    generating a second RF signal by amplifying a subset of the frequencies of the first RF signal; and
    transmitting the second RF signal through the second RF segment, wherein the second RF segment substantially follows a shape of the second length of the optical path of the optical traveling wave modulator.

16. The method of claim 15, further comprising transmitting a third RF signal through a transmission line, amplifying the third RF signal; and
    wherein generating the second RF signal comprises combining the third RF signal with the first RF signal upon outputting the first RF signal from the first RF segment.

17. The method of claim 16, further comprising generating the first RF signal and the third RF signal from a common RF signal.

18. The method of claim 16, further comprising delaying the third RF signal by a duration such that the first RF signal and the third RF signal are synchronized.

19. The method of claim 15, wherein the subset of frequencies comprises a band-pass spectrum.

20. The method of claim 19, wherein the band-pass spectrum comprises frequencies between 10 GHz and 60 GHz.

21. The method of claim 15, further comprising modulating the optical signal in the second length of the optical path with the second RF signal.

* * * * *